(12) United States Patent
Chung

(10) Patent No.: US 6,914,520 B2
(45) Date of Patent: Jul. 5, 2005

(54) HELMET WARNING DEVICE

(76) Inventor: Yu-Lin Chung, No. 4, Lane 130, Nan-Kang Rd., Sec. 3, Taipei (TW)

( * ) Notice: Subject to any disclaimer, the term of this patent is extended or adjusted under 35 U.S.C. 154(b) by 106 days.

(21) Appl. No.: 10/384,522

(22) Filed: Mar. 11, 2003

(65) Prior Publication Data

US 2004/0178903 A1 Sep. 16, 2004

(51) Int. Cl.7 .................................................. H05B 41/00
(52) U.S. Cl. ...................... 340/332; 340/489; 340/468; 340/459; 362/106; 362/473
(58) Field of Search ................................ 340/332, 459, 340/463, 464, 472, 468, 475, 478, 489; 362/473, 498, 499, 541, 545

(56) References Cited

U.S. PATENT DOCUMENTS 4,956,752 A  *  9/1990  Foglietti ...................... 340/432
5,207,500 A  *  5/1993  Rios et al. ................... 362/105
5,508,900 A  *  4/1996  Norman ....................... 362/106
5,910,764 A  *  6/1999  Hayden ....................... 340/479
6,406,168 B1 *  6/2002  Whiting ....................... 362/473
6,529,126 B1 *  3/2003  Henry .......................... 340/467

* cited by examiner

Primary Examiner—Jeffery Hofsass
Assistant Examiner—Daniel Previl
(74) Attorney, Agent, or Firm—Bacon & Thomas

(57) ABSTRACT

A helmet warning device. A device relates to a receiver and a warning device with indicators on a helmet. A transmitter, disposed on the scooter, connects to signal lights and brake lights on the scooter. When a driver puts on the helmet and starts the scooter, signals are transmitted by the transmitter in the scooter while the driver operates the signal lights or brake lights, and signals are received by the receiver in the helmet. Turn or brake warning flashes are shown by the indicators on the helmet.

4 Claims, 2 Drawing Sheets

HELMET WARNING DEVICE

BACKGROUND OF THE INVENTION

1) Field of the Invention

The present invention relates to a helmet warning device, more particularly a warning device disposed on the helmet with functions of both direction and safety signaling, like third brake light of automobile. It assures the safety of the rider and prevents traffic accidents.

2) Description of the Prior Art

The conventional scooter is equipped with warning devices such as left and right signal lights and brake light. Said warning devices are installed on the main body of the scooter; the location thereof is low. When the traffic is busy, said warning devices are often overlooked by the following vehicles, particularly automobile drivers or traffic in rain. Accidents still happen quite frequently. Therefore, it is a pressing issue to protect scooter riders and prevent accidents. Although, compared to the main body of the scooter, the location of the conventional helmet is higher and more obvious, the helmet itself does not have function of safety indication.

SUMMARY OF THE INVENTION

The purpose of the present invention relates to a receiver and a warning device with indicators herein on the helmet, and a transmitter installed in the scooter. While the rider signals right or left turn or brakes, the receiver on the helmet receives signals sent by the transmitter in the scooter. Then the indicators flash the warning lights thereby assuring the safety of the rider.

Another purpose of the present invention is, when the helmet does not interact with the transmitter in the scooter, with an additional switch, polar plates and an additional battery on the helmet, the helmet alone can flash warning lights and serve as a construction helmet with warning lights.

DETAILED DESCRIPTION OF THE PREFERRED EMBODIMENTS

Figure 1:
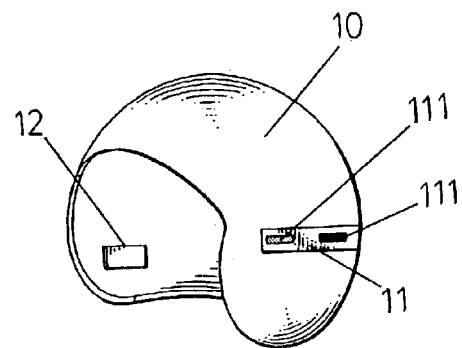
FIG. 1 is a perspective drawing of a helmet with a warning device therein, according to the present invention.
Figure 2:
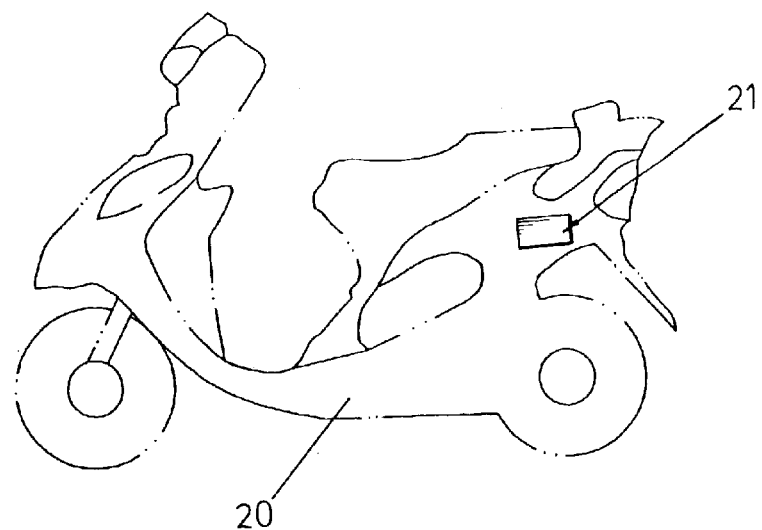
FIG. 2 is a plan view drawing of a scooter with a transmitter therein, according to the present invention.

Referring to FIG. 1 and FIG. 2, the present invention relates to a helmet warning device comprising a warning device (11) and a receiver (12) installed on a helmet (10), and a transmitter (21) installed in a scooter (20).

The warning device (11) of the helmet (10) herein is a strap of water and dust proof sealed structure which can stick arbitrarily to the helmet (10) or other items. A plurality of indicators are disposed in said warning device (11). The indicators herein are illuminating LEDs or light bulbs which can be of single color, multiple colors or flashes, and also be collocated with alarms (such as the reversing alarm of cars). A receiver (12) is installed on the interior of the helmet (10). The power source of the receiver (12) and the warning device (11) can be a battery (13) or polar plates. The battery is charged by the polar plates during the day and provides power to the helmet during the night.

Figure 3:
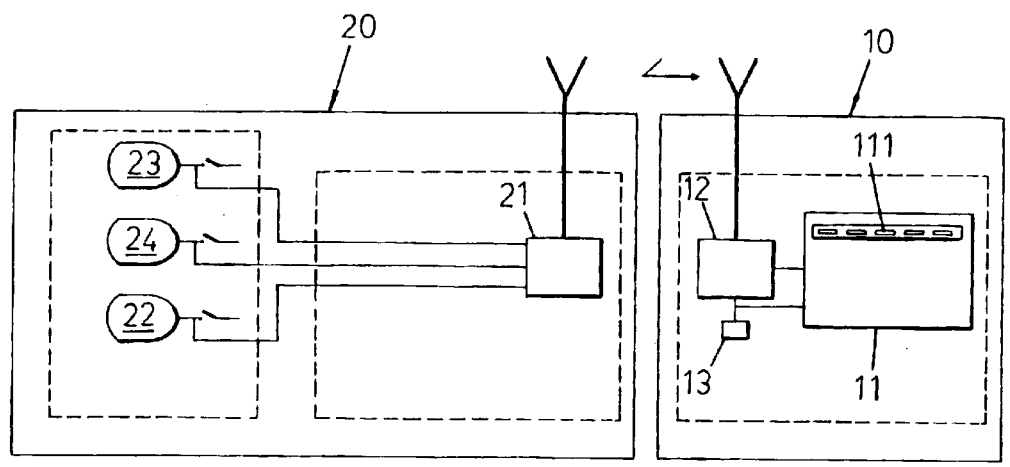
FIG. 3 is a pictorial block diagram of the present invention.

Referring to FIG. 3, a transmitter (21) on the scooter (20) is a signal detector connected with the right and left signal lights (22, 23) and brake light (24).

When a rider puts on the helmet (10) and starts the scooter, the warning device (11) thereof starts simultaneously. When the rider triggers the left or right signal lights (22, 23) of the scooter (20), the receiver (12) on the helmet (10) automatically receives the signals from the transmitter (21) in the scooter (20). Then the indicators (111) flash the left turn or right turn lights right away. Similarly, when the scooter (20) brakes, the transmitter (21) in the scooter (20) sends the braking signal which is automatically received by the receiver (12) in the helmet, and then the indicators (11) flash the brake warning light right away.

Figure 4:
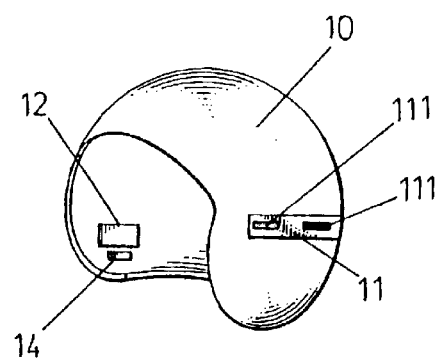
FIG. 4 is a schematic drawing of the preferred embodiment applied on a helmet according to the present invention.

Additionally, as shown in FIG. 4, a switch (14), a set of polar plates and an additional battery can be disposed on the helmet (10). When the warning device (11) of the helmet (10) is used alone without interacting with the transmitter (21) of the scooter (20), the switch (14) can be turned on, so the indicators (111) on the warning device (11) flash and thereby the helmet (10) functions as a construction helmet with warning lights.

To sum up, the present invention relates to a warning device with indicators wherein and a receiver installed in the conventional helmet, and a transmitter in the scooter connected with the signal lights and brake light of the scooter. When a rider puts on the helmet and triggers the right or left signal lights or brakes, the transmitter in the scooter sends out signals simultaneously which are received by the receiver in the warning device; then indicators flash left turn, right turn, or brake warning lights.

What is claimed is:

1. A helmet warning system, comprising:

a warning device with indicators and a receiver installed on a helmet;

a transmitter is configured to be installed in a scooter and connected with left and right signal lights of the scooter and brake light thereof;

the indicators comprise a right turn light, left turn light and brake warning light;

the warning device on the helmet is activated when the helmet is worn by a user;

upon activation of the right or left signals or brakes of the scooter, corresponding signals are sent by the transmitter in the scooter and are received by the receiver in the helmet;

whereby the indicators flash one of the right turn light, the left turn light or the brake warning light of the indicators; and the warning device comprises a strap shape and can stick arbitrarily to the helmet or other items.

2. The helmet warming system according to claim 1, wherein the indicators of the warning device are one of illuminating LEDs or light bulbs.

3. The helmet warning system according to claim 1, wherein the power of the warning device and the receiver on the helmet is provided by batteries or popular plates.

4. The helmet warning system according to claim 1, wherein a switch and an additional battery are disposed on the helmet; when the warning device of the helmet is used alone, independent of the transmitter, the switch can be turned on and thereby the indicators on the warning device flash the warning lights; the battery can be charged by the polar plates during the day and provide power to the warning device during the night.

* * * * *